(12) United States Patent
Panwar et al.

(10) Patent No.: US 8,824,491 B2
(45) Date of Patent: Sep. 2, 2014

(54) DISTRIBUTED SCHEDULING FOR VARIABLE-SIZE PACKET SWITCHING SYSTEM

(75) Inventors: Shivendra S. Panwar, Freehold, NJ (US); Yanming Shen, Brooklyn, NY (US); Shunyuan Ye, Brooklyn, NY (US)

(73) Assignee: Polytechnic Institute of New York University, Brooklyn, NY (US)

( * ) Notice: Subject to any disclaimer, the term of this patent is extended or adjusted under 35 U.S.C. 154(b) by 235 days.

(21) Appl. No.: 13/281,046

(22) Filed: Oct. 25, 2011

(65) Prior Publication Data

US 2012/0128007 A1   May 24, 2012

Related U.S. Application Data

(60) Provisional application No. 61/406,207, filed on Oct. 25, 2010.

(51) Int. Cl.
*H04L 12/28* (2006.01)

(52) U.S. Cl.
USPC .......................... 370/412; 370/417; 370/429

(58) Field of Classification Search
USPC ........... 370/362–413, 417–429; 711/147–149
See application file for complete search history.

(56) References Cited

U.S. PATENT DOCUMENTS

| | | | |
|---|---|---|---|
| 7,031,330 B1* | 4/2006 | Bianchini, Jr. | 370/412 |
| 7,852,866 B2* | 12/2010 | Chao et al. | 370/412 |
| 2006/0077873 A1* | 4/2006 | Seo et al. | 369/275.1 |
| 2011/0170558 A1* | 7/2011 | Ye et al. | 370/417 |
| 2012/0128354 A1* | 5/2012 | Panwar et al. | 398/45 |

\* cited by examiner

*Primary Examiner* — M. Phan
(74) *Attorney, Agent, or Firm* — John C. Pokotylo; Straub & Pokotylo

(57) ABSTRACT

Scheduling methods and apparatus are provided for an input-queued switch. The exemplary distributed scheduling process achieves 100% throughput for any admissible Bernoulli arrival traffic. The exemplary distributed scheduling process includes scheduling variable size packets. The exemplary distributed scheduling process may be easily implemented with a low-rate control or by sacrificing the throughput by a small amount. Simulation results also showed that this distributed scheduling process can provide very good delay performance for different traffic patterns. The exemplary distributed scheduling process may therefore be a good candidate large-scale high-speed switching systems.

25 Claims, 11 Drawing Sheets

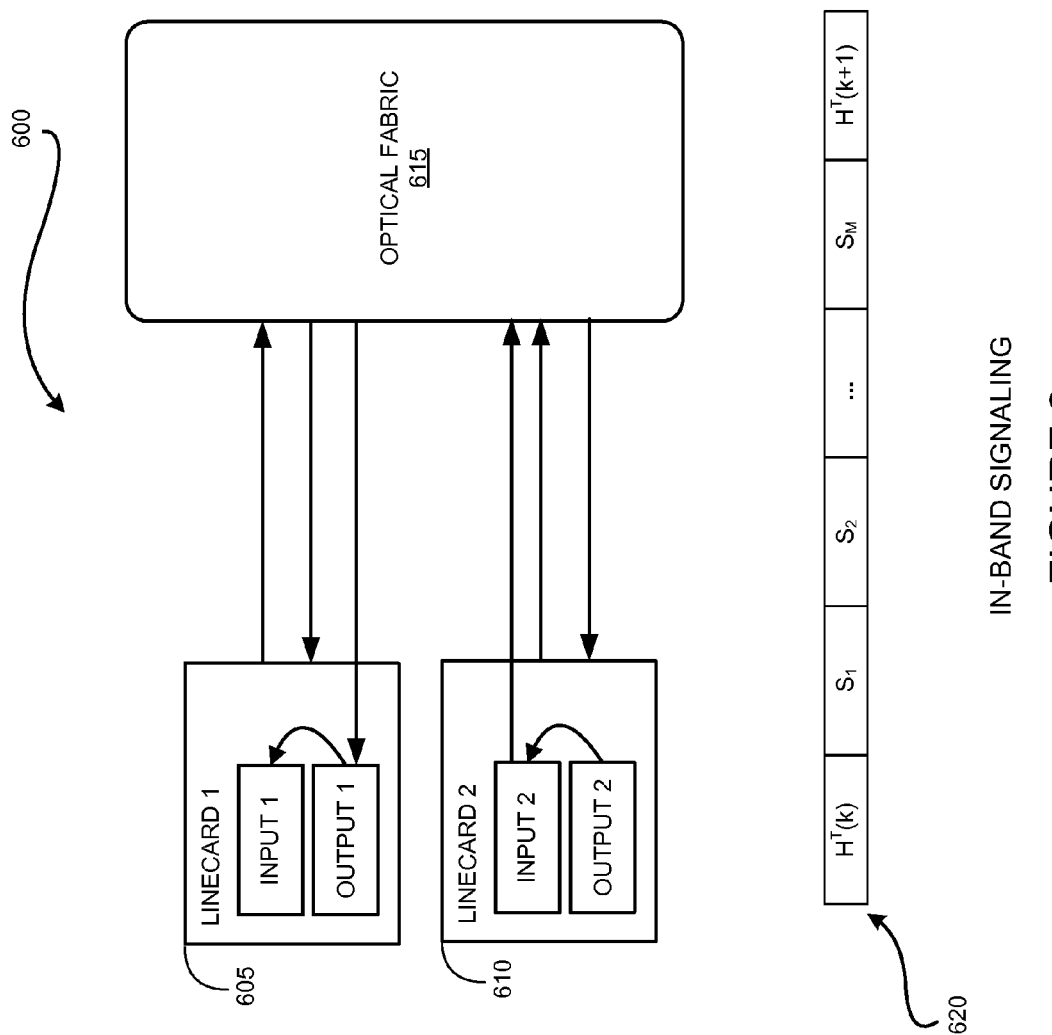

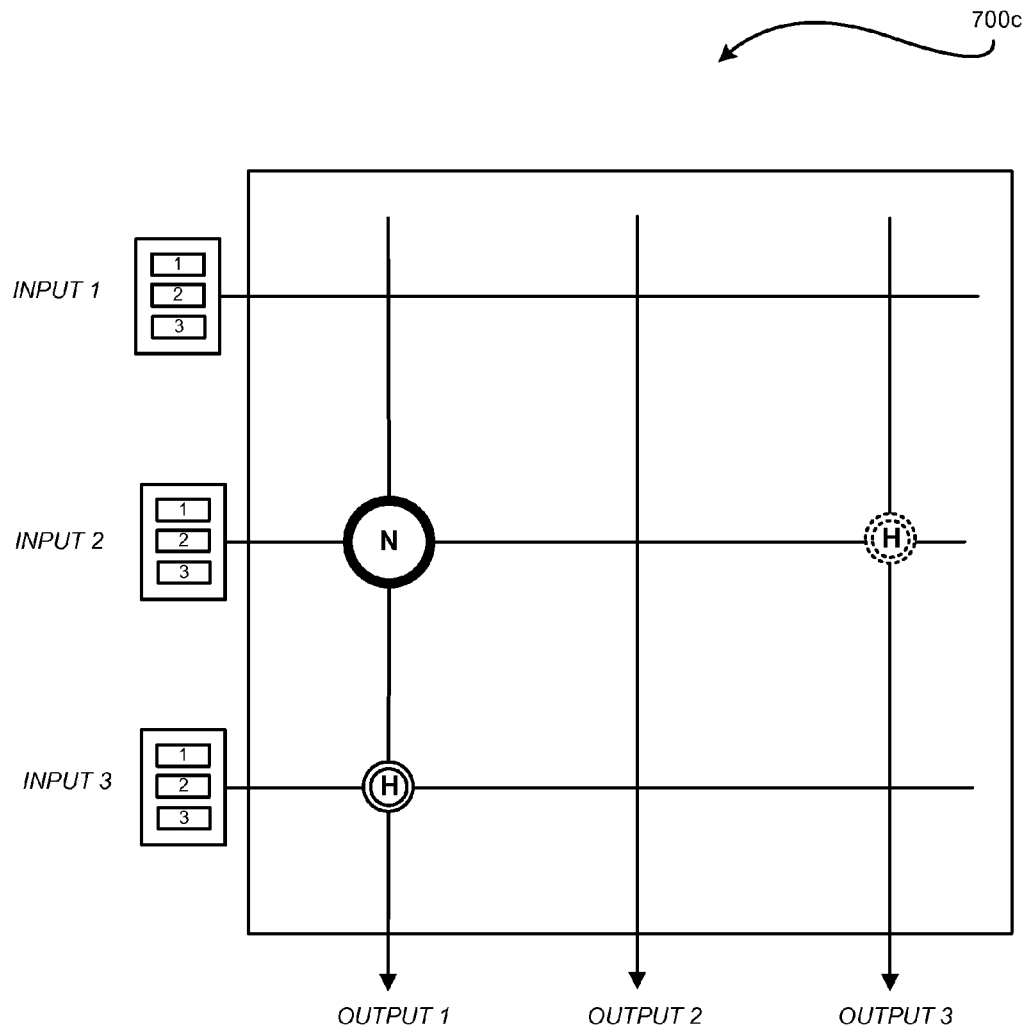
 CROSSPOINT IN UPDATED SCHEDULE (TIME SLOT N)
 CROSSPOINT IN HAMILTONIAN WALK SCHEDULE
 CROSSPOINT REMOVED (NOT ADDED TO UPDATED SCHEDULE)
FIGURE 7C

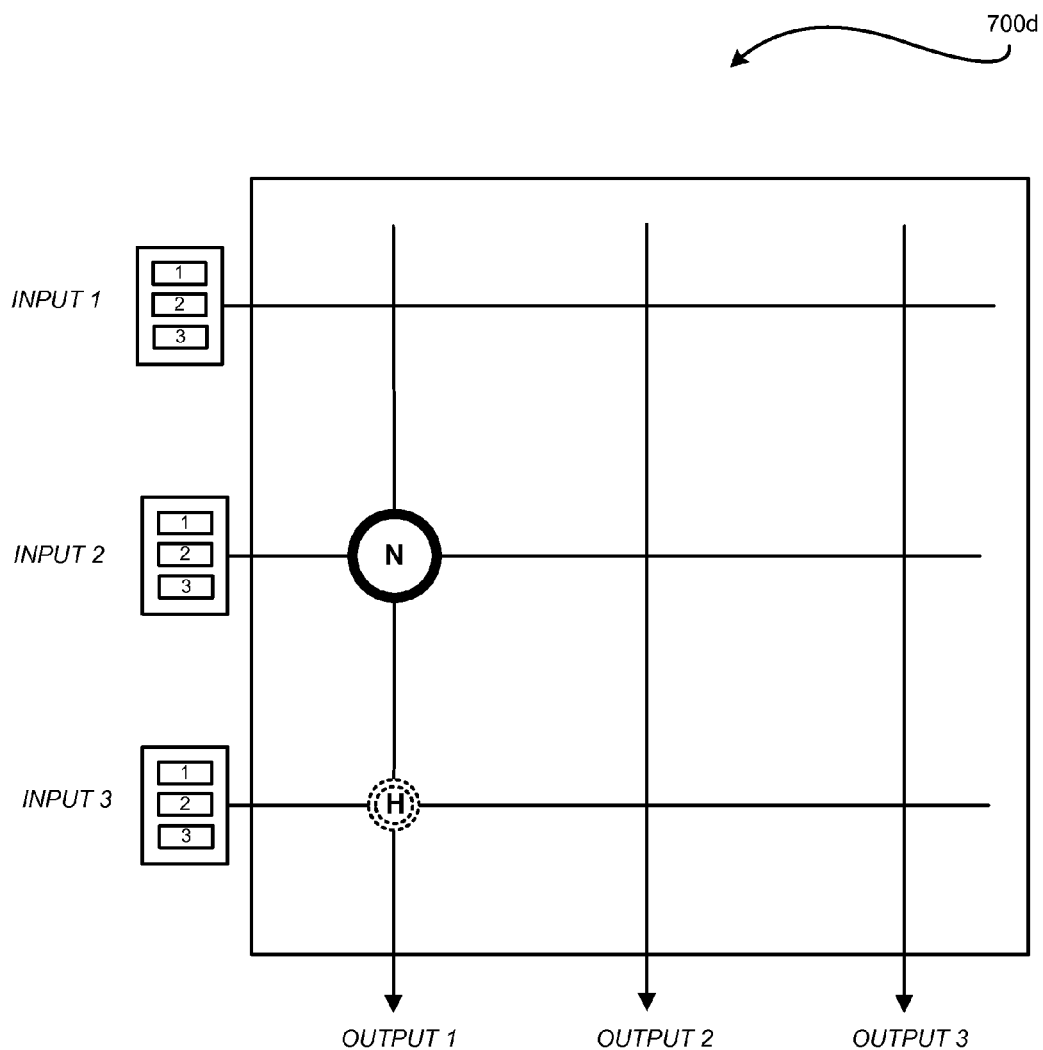
 CROSSPOINT IN UPDATED SCHEDULE (TIME SLOT N)
 CROSSPOINT REMOVED (NOT ADDED TO UPDATED SCHEDULE)
FIGURE 7D

DISTRIBUTED SCHEDULING FOR VARIABLE-SIZE PACKET SWITCHING SYSTEM

§1. RELATED APPLICATIONS

This application claims the benefit of U.S. Provisional Patent Application Ser. No. 61/406,207 (incorporated herein by reference and referred to as "the '207 provisional"), filed on Oct. 25, 2010, titled "DISTRIBUTED SWITCHING METHODS AND APPARATUS: DISQUO, HELIOS AND ALLERTON" and listing Shivendra S. PANWAR, Yanming SHEN and Shunyuan YE, and as the inventors. The present invention is not limited to requirements of the particular embodiments described in the '207 provisional application.

§2. BACKGROUND OF THE INVENTION

1. Field of the Invention

The present invention concerns switches used in communications networks. More specifically, the present invention concerns scheduling of packets sent through the switching fabric of such a switch.

2. Background Information

Internet traffic has increased drastically in recent years. Expected traffic demand will require future packet switching systems to switch packets in a very short time (just a few nanoseconds). Scheduling algorithms with lower computation complexity are desirable for such high-speed switching. Among the existing algorithms that may achieve 100% throughput for any admissible Bernoulli traffic, ALGO3 (See, e.g., the article, P. Giaccone, B. Prabhakar, and D. Shah, "Toward Simple, High Performance Schedulers for High-Aggregate Bandwidth Switches," *Proc. of IEEE INFOCOM*, (New York, 2002), incorporated herein by reference.) and EMHW (See, e.g., the article, Y. Li, S. Panwar, and H. J. Chao, "Exhaustive Service Matching Algorithms for Input Queued Switches," *Proc. of IEEE HPSR* (Phoenix, Ariz.) (April 2004), incorporated herein by reference.) have the lowest computational complexity, which is $O(\log N)$, where N is the number of ports in the switch.

The seminal work by Tassiulas and Ephremides (See, e.g., the article, L. Tassiulas and A. Ephremides, "Stability Properties of Constrained Queuing Systems and Scheduling Policies for Maximum Throughput in Multihop Radio Networks," *IEEE Transactions on Automatic Control*, 37(12): 1936-1949 (December 1992), incorporated herein by reference.) initiated the study of scheduling algorithms in packet switching systems and wireless networks. Maximum weight matching (MWM), which was proposed in the Tassiulas-Ephremides article, can stabilize the system whenever the arrival traffic is admissible Bernoulli i.i.d. However, the MWM algorithm may not be practical due to its $O(N^3)$ complexity.

A number of practical scheduling algorithms, such as iSLIP (See, e.g., the article, N. Mckeown, "The iSLIP Scheduling Algorithm for Input-Queued Switches," *IEEE/ACM Transactions on Networking*, vol. 7, pp. 188-201 (April 1999), incorporated herein by reference.), iLQF (See, e.g., N. Mckeown, "Scheduling Algorithms for Input-queued Cell Switches," *Ph.D. Thesis, University of California at Berkeley*, (1995), incorporated herein by reference.) and DRRM (See, e.g., the article, Y. Li, S. Panwar, and H. J. Chao, "On the Performance of a Dual Round-Robin Switch," *Proc. of IEEE INFOCOM* (April 2001), incorporated herein by reference.), were proposed for real implementation. However, when the arriving traffic is non-uniform, these algorithms cannot achieve 100% throughput, and induce a higher delay as compared to the MWM algorithm.

A randomized scheduling algorithm with a linear complexity of $O(N)$ was proposed by Tassiulas. (See, e.g., the article, L. Tassiulas, "Linear Complexity Algorithms for Maximum Throughput in Radio Networks and Input Queued Switches," *Proc. of IEEE INFOCOM*, (New York), (1998), incorporated herein by reference.) The algorithm works as follows. Let $S(n-1)$ represent the schedule at time $n-1$. At the beginning of time slot n, it randomly generates a schedule $R(n)$, and then compare the weights of $S(n-1)$ and $R(n)$, where the weight of a schedule is defined as: $W(S)=\Sigma_{i,j} S_{ij} \times Q_{ij}$. Then the new schedule is decided following the rule: $S(n)= \arg\max_{S \in [S(n-1), R(n)]} W(S)$ As can be seen, the algorithm uses the memory of the schedule in the previous time slot $S(n-1)$. Therefore, it can reduce the computation complexity to $O(N)$, and still achieve 100% throughput for any admissible Bernoulli traffic. However, its delay performance may be poor. Several algorithms were proposed by Giaccone et al. (See, e.g., the article, P. Giaccone, B. Prabhakar, and D. Shah, "Toward Simple, High Performance Schedulers for High-Aggregate Bandwidth Switches," *Proc. of IEEE INFOCOM*, (New York, 2002), incorporated herein by reference.) to improve the delay performance. Giaccone et al. noted that instead of picking a schedule between $S(n-1)$ and $R(n)$, a new schedule can be generated by adding heavy edges from $S(n-1)$ and $R(n)$. This is referred as a "merge". The new algorithm, which is called LAURA, can have a much better delay performance. SERENA, which also considers new arrivals, besides using memory, can have a much better delay performance than the one in the Tassiulas. But it also has a complexity of $O(N)$.

Li et al. (See, e.g., the articles, Y. Li, S. Panwar, and H. J. Chao, "Exhaustive Service Matching Algorithms for Input Queued Switches," *Proc. of IEEE HPSR* (Phoenix, Ariz.) (April 2004), incorporated herein by reference.) proposed a scheduling algorithm by using exhaustive service matching. The algorithm only has a complexity of $O(\log N)$, thus it still scales with increase in the size of a switch.

All these scheduling algorithms assume that variable-size packets are segmented into fixed-size cells after arriving. They are reassembled back into original packets at the output ports. Cells from a packet are switched independently, and a packet can leave the system only when all of its cells are received. These algorithms are referred to as cell-mode scheduling.

On the other hand, Marsan et al. (See, e.g., the article, M. A. Marsan, A. Bianco, P. Giaccone, E. Leonardi, and F. Neri, "Packet-Mode Scheduling in Input-Queued Cell-Based Switches," *IEEE Transactions on Networking*, Vol. 10 (October 2002), incorporated herein by reference.) proposed to switch variable-size packets directly. This is referred to as packet mode scheduling. In packet-mode scheduling, the input ports have to deliver typically all the cells from the segmentation of a packet contiguously. Therefore, the reassembly of packets at the output ports may be easier and may require less memory and complexity. They also showed that for some packet size distributions, packet-mode scheduling may have a better delay performance than the cell-mode scheduling. However, the scheduling algorithm proposed, which is called PI-MWM, is a modification of MWM. Therefore, it still has a high computation complexity. Ganjali et al. (See, e.g., the article, Y. Ganjali, A. Keshavarzian, and D. Shah, "Input Queued Switches: Cell Switching vs. Packet Switching," *Proc. of IEEE INFOCOM*, (San Francisco, Calif.) (2003), incorporated herein by reference.) show that PI-MWM is stable for any form of re-generative admissible traffic, rather than only Bernoulli traffic.

In view of the foregoing, it would be useful to provide an improved scheduling process which has a low computational complexity, has a simple hardware implementation, can schedule variable-size packets in both packet mode and cell mode, and is stabilized for any admissible Bernoulli traffic.

§3. SUMMARY OF THE INVENTION

Exemplary embodiments consistent with the present invention improve scheduling in switches, by providing a distributed scheduling process in which the switch can achieve 100% throughput under any admissible Bernoulli traffic matrix. Such a scheduling process, also referred to as Allerton scheduling process, has a low computational complexity of O(1), has a simple hardware implementation, can schedule variable-size packets in both packet mode and cell mode and is stabilized for any admissible Bernoulli traffic.

Exemplary embodiments consistent with the present invention provide an implementation of the Allerton scheduling process, by either using a low-rate control channel to pass a one-bit message or compromising in throughput moderately. In exemplary embodiments consistent with the present invention, the switch is an input-queued switch. Simulation results show that the exemplary scheduling process can provide good delay performance as compared to scheduling processes with higher complexity.

Exemplary embodiments consistent with the present invention provide a scheduler and scheduling method for scheduling cells in a switch having a plurality of output ports, a plurality of input ports (each of the plurality of input ports having a virtual output queue corresponding to each of the plurality of output ports), and a switch fabric coupling each of the input ports with each of the output ports. Such a scheduler or scheduling method may schedule cells by (a) generating or receiving a Hamiltonian walk schedule which defines, for each input port-output port crosspoint$_{i,j}$, whether the crosspoint$_{i,j}$ is in the Hamiltonian walk schedule or not; (b) accepting a previous schedule which defines, for each input port-output port crosspoint$_{i,j}$, whether the crosspoint$_{i,j}$ is in the previous schedule or not, wherein, (1) for each input port i, there is at most one crosspoint$_{i,j}$ scheduled in the previous schedule, and (2) for each output port j, there is at most one crosspoint$_i$ scheduled in the previous schedule; and (c) at each input port i, for each crosspoint$_{i,j}$, merging the previous schedule with the Hamiltonian walk schedule to define an updated schedule such that: (1) for a crosspoint$_{i,j}$ that is not in the Hamiltonian walk schedule, maintaining a value of the crosspoint$_{i,j}$ in the updated schedule as that value of the corresponding crosspoint$_{i,j}$ in the previous schedule, and (2) for a crosspoint$_{i,j}$ that is in the Hamiltonian walk schedule, (i) determining whether or not the crosspoint$_{i,j}$ belongs to the previous schedule, (ii) responsive to a determination that the crosspoint$_{i,j}$ does belong to the previous schedule, (A) determining whether or not a transmission of a packet from input port i to output port j has concluded, (B) responsive to a determination that the transmission of the packet from input port i to output port j has not concluded, maintaining a value of the crosspoint$_{i,j}$ in the updated schedule as that value of the corresponding crosspoint$_{i,j}$ in the previous schedule, and (C) responsive to a determination that the transmission of the packet between input port i and output port j has concluded, determining whether or not to maintain the crosspoint$_{i,j}$ in the updated schedule as a function of an occupancy of the $j^{th}$ virtual output queue corresponding to the input port i, and (iii) responsive to a determination that the crosspoint$_{i,j}$ does not belong to the previous schedule, (A) determining whether or not any neighbor crosspoints$_{k,l}$ of crosspoint$_{i,j}$ belong to the previous schedule by acts including receiving one-bit information from output port j, which indicates whether the output port j received a packet from an input port k, different from input port i, in a time slot immediately before a current time slot, and responsive to a determination that the output port j did receive a packet from an input port k, different from input port i, in the time slot immediately before the current time slot, determining that the crosspoint$_{k,j}$ belonged to the previous schedule, (B) responsive to a determination that a neighbor crosspoint$_{k,l}$ of the crosspoint$_{i,j}$ belonged to the previous schedule, excluding the crosspoint$_{i,j}$ from the updated schedule, and (C) responsive to a determination that a neighbor crosspoint$_{k,l}$ of the crosspoint$_{i,j}$ did not belong to the previous schedule, determining whether or not to add the crosspoint$_{i,j}$ to the updated schedule as a function of an occupancy of the $j^{th}$ virtual output queue corresponding to the input port i.

§4. BRIEF DESCRIPTION OF THE DRAWINGS

FIG. 6 illustrates an exemplary method of sending one-bit information from an output port to an input port of the switch, consistent with the present invention.

FIGS. 7A-7E illustrate a simple example of operations of an exemplary scheduling method consistent with the present invention.

§5. DETAILED DESCRIPTION

The present invention may involve novel methods, apparatus, message formats, and/or data structures for scheduling the serving of cells in an input-queued switch. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

An exemplary switch in which, or with which, exemplary schedulers consistent with the present invention may be used is described in §5.1 below. Exemplary apparatus which may be used to implement methods consistent with the present invention are described in §5.2. Then, exemplary methods consistent with the present invention are described in §5.3. Examples illustrating operations of exemplary scheduling methods consistent with the present invention are described in §5.4. Thereafter, some characteristics of at least some of the exemplary embodiments are set forth in §5.5. Finally, some conclusions are presented in §5.6.

§5.1 EXEMPLARY ENVIRONMENT

Figure 1:
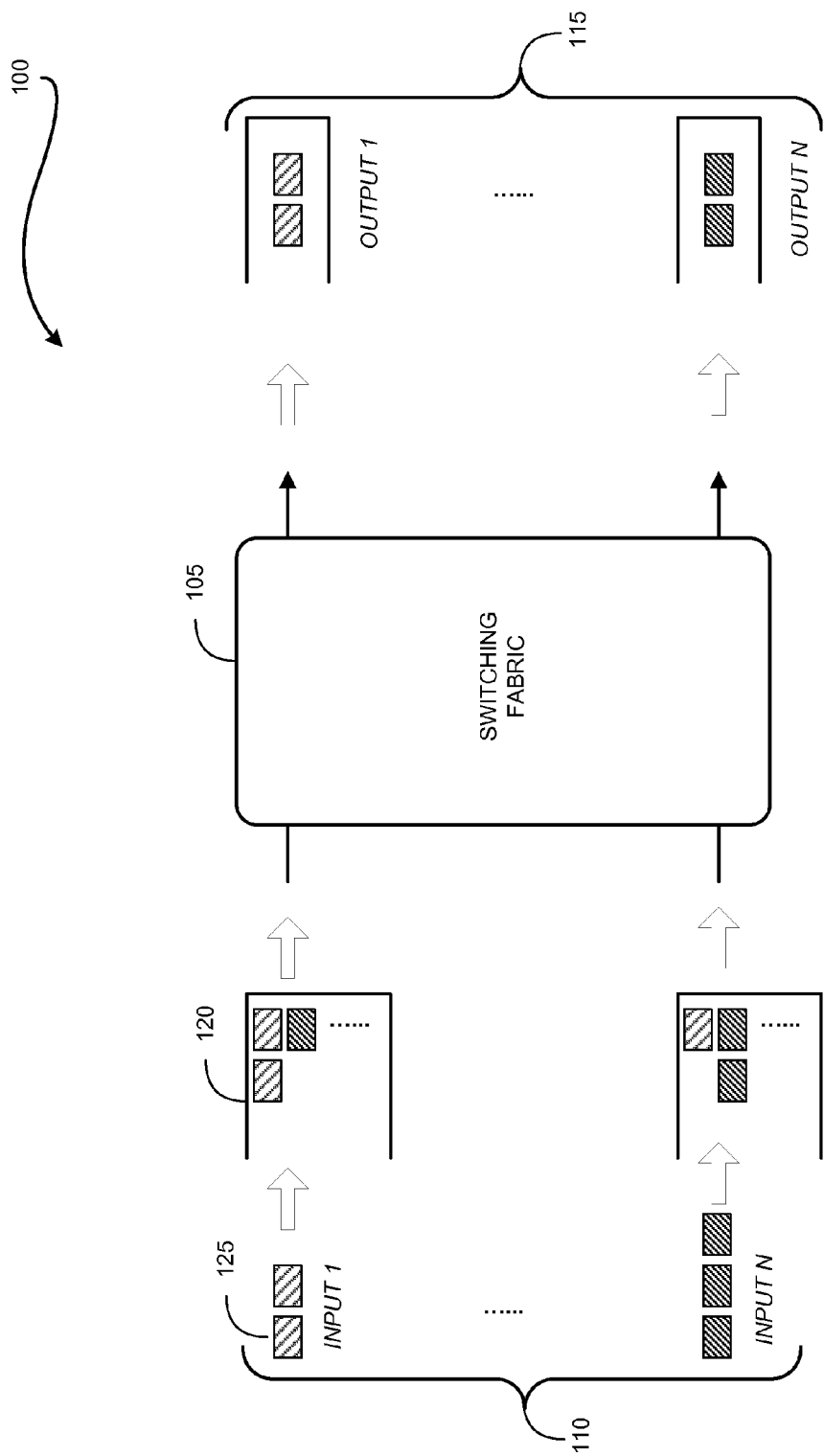
FIG. 1 is a block diagram of an exemplary switch in which each input port has a VOQ corresponding to each of the output ports, and in which or with which a scheduler consistent with the present invention may be used.

FIG. 1 is a block diagram of an N×N input-queued switch 100 in which input ports 110 are coupled with the output ports 115 via a switching fabric 105. Each input port 110 has a virtual output queue (VOQ) 120 corresponding to each of the output ports 115. The input ports 110 use VOQs 120 to prevent head-of-line blocking Specifically, each input port 110 maintains N VOQs 120, one for each output of the N output ports 115. In at least some embodiments, the switch 100 supports variable size packet switching by packet segmentation and reassembly. Although a N×N switch is shown in FIG. 1, embodiments consistent with the present invention may be used in M×N switches, having different numbers of inputs and outputs.

The following notation is used in the description. Let $(i,j)$ represent the crosspoint between input $i$ and output $j$. Let $VOQ_{ij}$ represent the VOQ at input port $i$ for output port $j$, (crosspoint $(i,j)$). Let $Q_{ij}(n)$ denote the total queued packet length expressed in number of cells, in $VOQ_{ij}$ at time $n$, where $n=0, 1, 2, \ldots$.

The evolution of a queue length is expressed as $Q_{ij}(n+1) = Q_{ij}(n) + A_{ij}(n) - D_{ij}(n)$, where $A_{ij}(n)$ represents the number of cells arrived at $VOQ_{ij}$ at time $n$, and $D_{ij}(n)$ represents the number of cells departed from $VOQ_{ij}$ at time $n$. For any VOQ, it is assumed that the arrivals $A_{ij}(n)$ are independent and identically distributed (i.i.d.) over $n$, and the distribution of $A_{ij}(n)$ is Bernoulli. Without speedup, $D_{ij}(n)$ can only be 0 or 1 at any time $n$.

Let represent the arrival rate of traffic between input $i$ and output $j$.

Definition 1:
An arrival process is said to be admissible if it satisfies:

$$\Sigma_j \lambda_{ij} < 1, \text{ and } \Sigma_i \lambda_{ij} < 1 \qquad (1)$$

Let $S(n)$ represent a schedule at time $n$. In at least some exemplary embodiments, $S(n)$ is N×N matrix such that $S \in \{0, 1\}^{N \times N}$. If an input $i$ is transmitting to output $j$ at time $n$, then $S_{ij}(n)=1$. Otherwise, $S_{ij}(n)=0$. In at least some exemplary embodiments, $S(n)$ is a set, and $(i,j) \in S(n)$ if $S_{ij}(n)=1$. $VOQ_{ij}$ or the connection $(i,j)$ is active at time $n$, if $S_{ij}(n)=1$. Otherwise, the VOQ is inactive. In at least some exemplary embodiments, when $(i,j) \in S(n)$, then crosspoint $(i,j)$ is active, and input $i$ is connected to output $j$ so that one cell from a packet can be delivered from input $i$ to output $j$. Otherwise, $(i,j)$ is referred to as inactive if $S_{ij}(n)=0$.

Definition 2:
An Allerton schedule $S(n)$ is an N×N matrix, where $S_{ij}(n) \in \{0, 1\}$, and $\Sigma_i S_{ij}(n) \leq 1$, $\Sigma_j S_{ij}(n) \leq 1$.

For a feasible Allerton schedule S, if $S_{ij}=1$, then $\forall i' \neq i$, $S_{i'j}=0$ and $\forall j' \neq j$, $S_{ij'}=0$. These crosspoints are defined as its neighbors.

Definition 3:
For a crosspoint $(i,j)$, its neighbors are defined as:

$$N(i,j) = \{(i',j) \text{ or } (i,j') | \forall i' \neq i, \forall j' \neq j\} \qquad (2)$$

Therefore, for a feasible schedule S, if $(i,j) \in S$, then $\forall (k,l) \in N(i,j)$, $(k,l) \notin S$. S1 and S2, shown below, are two feasible schedules for a 3×3 switch. A feasible schedule is not necessarily a permutation matrix (e.g., a square binary matrix that has exactly one entry 1 in each row and each column, and 0s elsewhere). For example, S2, as can be seen, is not a permutation matrix.

$$S_1 = \begin{bmatrix} 1 & 0 & 0 \\ 0 & 0 & 1 \\ 0 & 1 & 0 \end{bmatrix}$$

$$S_2 = \begin{bmatrix} 0 & 0 & 0 \\ 0 & 1 & 0 \\ 1 & 0 & 0 \end{bmatrix}$$

Let S represent the set of all feasible schedules, and $|S|$ represent the size of the set S. For a N×N input-queued switch:

$$N! < |S| < 2^{N \times N}, N \geq 2: \qquad (3)$$

§5.2 EXEMPLARY APPARATUS

Embodiments consistent with the present invention might be implemented in hardware, such as one or more field programmable gate arrays (FPGAs), one or more integrated circuits such as an application specific integrated circuit (ASICs), and/or one or more network processors, etc. Alternatively, or in addition, embodiments consistent with the present invention might be implemented as stored program instructions executed by a processor.

Such hardware and/or software might be provided in an addressed data (e.g., packet, cell, etc.) forwarding device (e.g., a switch, a router, etc.).

Figure 2:
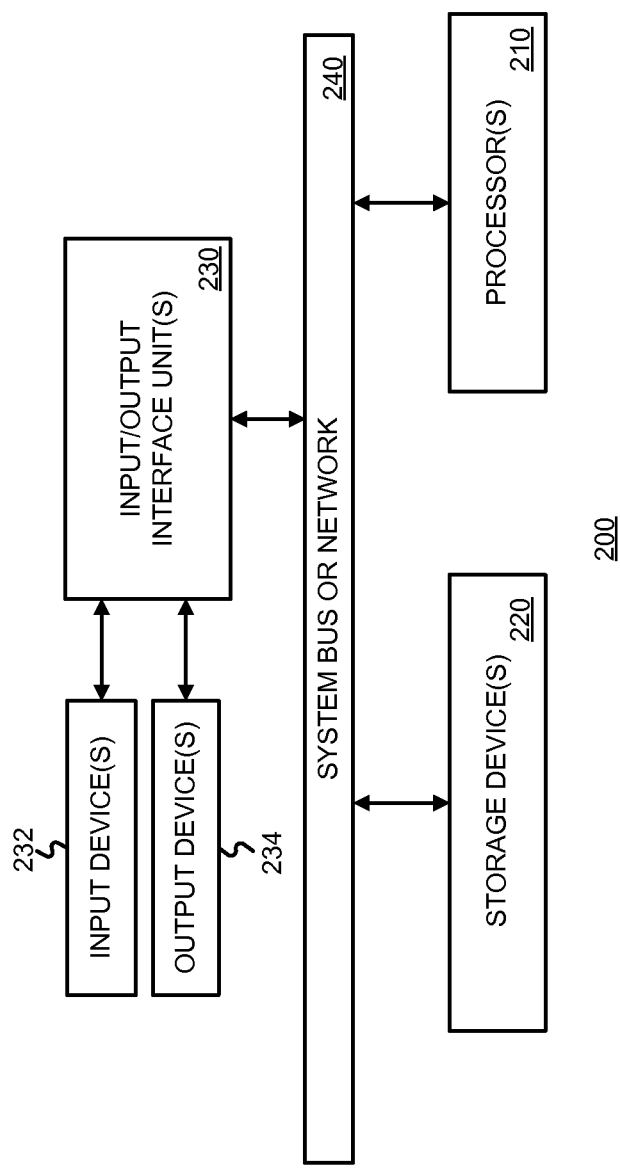
FIG. 2 is a block diagram of an exemplary apparatus that may perform various operations, and store various information generated and/or used by such operations, in a manner consistent with the present invention.

FIG. 2 is high-level block diagram of an exemplary machine 200 that may perform one or more of processes described in this application, and/or store information used and/or generated by such processes. The exemplary machine 200 includes one or more processors 210, one or more storage devices 220, one or more input/output interface units 230, and one or more system buses and/or networks 240 for facilitating the communication of information among the coupled elements. One or more input devices 232 and one or more output devices 234 may be coupled with the one or more input/output interfaces 230. The one or more processors 210 may execute machine-executable instructions (e.g., C or C++ running on the Solaris operating system or the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 220 and/or may be received from an external source via one or more input interface units 230.

In some embodiments consistent with the present invention, the processor(s) 210 may be one or more microprocessors. The bus 240 may include a system bus. The storage devices 220 may include system memory, such as read only memory (ROM) and/or random access memory (RAM). The storage devices 220 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

§5.3 EXEMPLARY SCHEDULING METHODS: ALLERTON SCHEDULING

Figure 4:
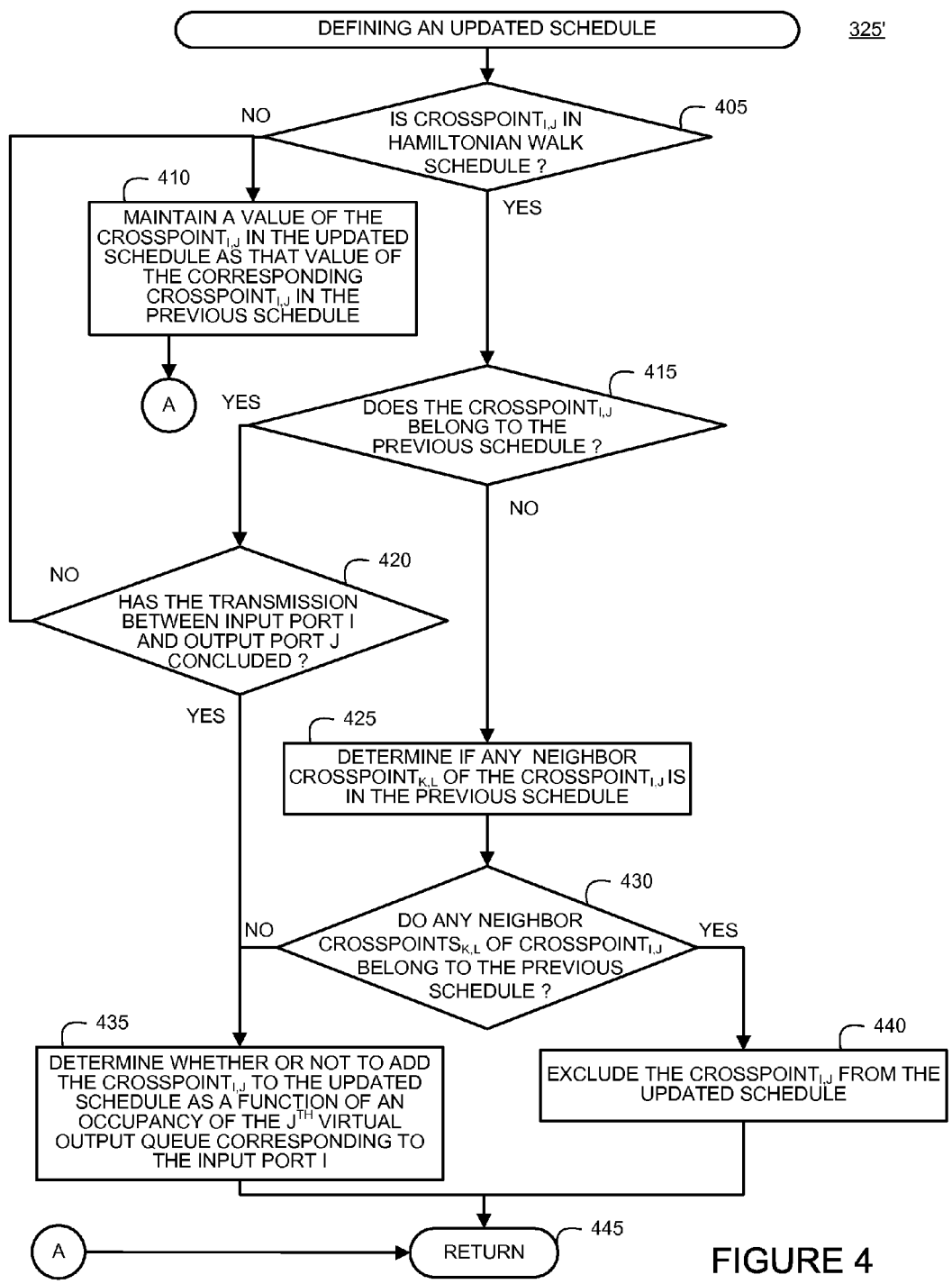
FIG. 4 is a flow diagram of an exemplary method for defining an updated schedule in an exemplary distributed scheduling method, consistent with the present invention.
Figure 5:
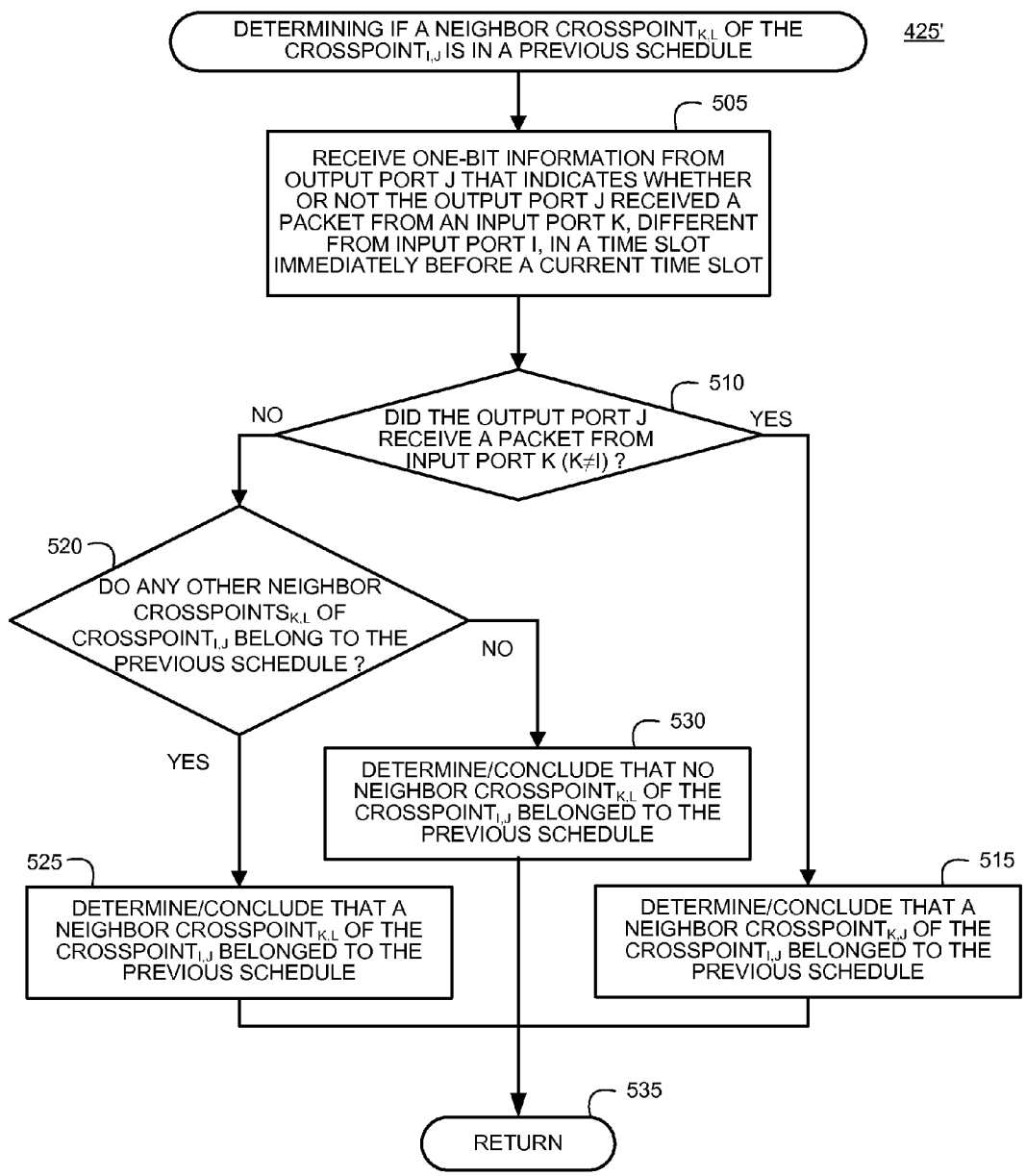
FIG. 5 is a flow diagram of an exemplary method for determining neighbor crosspoints of a crosspoint, for use in an exemplary distributed scheduling method, consistent with the present invention.

A scheduling method consistent with the present invention is described with reference to FIGS. 3-5. Then, an exemplary distributed embodiment (Allerton Scheduling) is described in §6.3.1.

Figure 3:
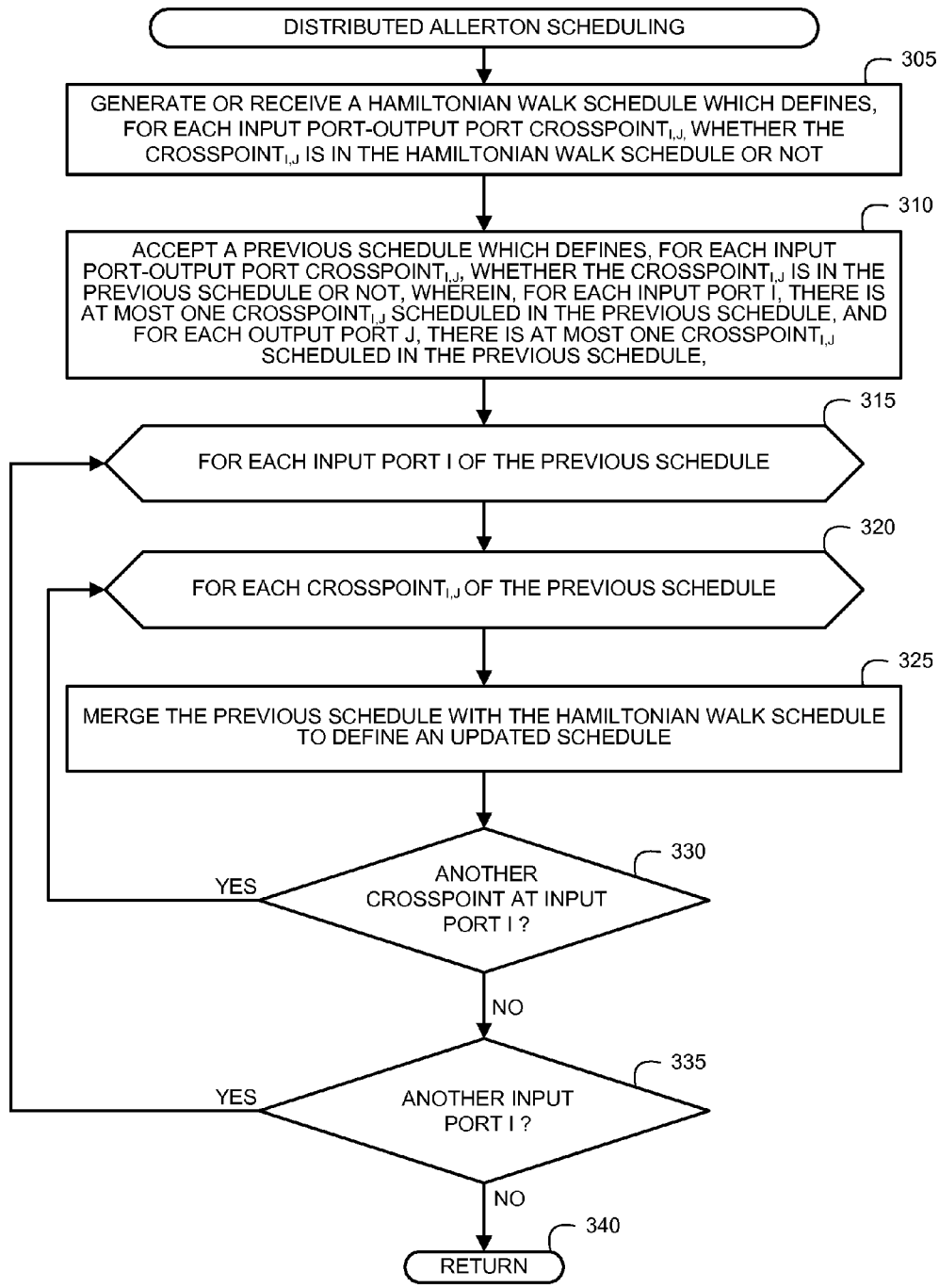
FIG. 3 is a flow diagram of an exemplary scheduling method consistent with the present invention.

FIG. 3 is a flow diagram of an exemplary scheduling method 300 consistent with the present invention. The scheduling method 300 of FIG. 3 may be used with an input-queued switch having (1) a plurality of output ports, (2) a plurality of input ports (each of the plurality of input ports having a virtual output queue corresponding to each of the plurality of output ports), and (3) a switch fabric coupling each of the input ports with each of the output ports, defining crosspoints. In an exemplary embodiment, the scheduling method 300 is executed at each of the inputs of the input-queued switch. A Hamiltonian walk schedule (See, e.g., the article, P. Giaccone, B. Prabhakar, and D. Shah, "Toward Simple, High Performance Schedulers for High-Aggregate Bandwidth Switches," *Proc. of IEEE INFOCOM* (New York, 2002), incorporated herein by reference.) which defines, for each input port-output port crosspoint$_{i,j}$, whether the crosspoint$_{i,j}$ is in the Hamiltonian walk schedule or not is generated or received. (Block 305) A previous schedule which defines, for each input port-output port crosspoint$_{i,j}$, whether the crosspoint$_{i,j}$ is in the previous schedule or not, is accepted. (Block 310) In the previous schedule, (1) for each input port i, there is at most one crosspoint$_{i,j}$ scheduled in the previous schedule, and (2) for each output port j, there is at most one crosspoint$_{i,j}$ scheduled in the previous schedule. Finally, for each input port i (loop 315-330) and for each crosspoint$_{i,j}$ (loop 320-335), the previous schedule is merged with the Hamiltonian walk schedule to define an updated schedule. (Block 325) In at least some exemplary embodiments consistent with the present invention, the updated schedule is for a current time slot, n, and the previous schedule is for a time slot immediately preceding the current time slot, n−1.

Referring back to block 325, FIG. 4 is a flow diagram of an exemplary method 325' for defining an updated schedule in a manner consistent with the present invention. It is determined whether or not a crosspoint$_{i,j}$ is in the Hamiltonian walk schedule. (Decision 405) Responsive to a determination that the crosspoint$_{i,j}$ is not in the Hamiltonian walk schedule, a value of the crosspoint$_{i,j}$ in the updated schedule is maintained as that value of the corresponding crosspoint$_{i,j}$ in the previous schedule (Block 410) and the method is left (Node 445). On the other hand, responsive to the determination that the crosspoint$_{i,j}$ is in the Hamiltonian walk schedule, it is determined whether or not the crosspoint$_{i,j}$ belongs to the previous schedule. (Decision 415) Responsive to a determination that the crosspoint$_{i,j}$ does belong to the previous schedule, it is determined whether or not the transmission between input port i and output port j has concluded. (Decision 420) Responsive to a determination that the transmission between input port i and output port j has concluded, it is determined whether or not to maintain the crosspoint$_{i,j}$ in the updated schedule based on an occupancy of the j$^{th}$ virtual output queue corresponding to the input port i (Block 435) before the method 325' is left (Node 445). Referring back to decision 420, responsive to a determination that the transmission between input port i and output port j has not concluded, the value of the crosspoint$_{i,j}$ in the updated schedule is maintained as that value of the corresponding crosspoint$_{i,j}$ in the previous schedule (Block 410) and the method is left (Node 445). Referring back to decision 415, responsive to a determination that the crosspoint$_{i,j}$ does not belong to the previous schedule, it is determined if any neighbor crosspoints$_{k,l}$ of crosspoint$_{i,j}$ belong to the previous schedule. (Block 425) It is then determined whether or not any neighbor crosspoints$_{k,l}$ of crosspoint$_{i,j}$ belong to the previous schedule. (Decision 430) (FIG. 5 illustrates an exemplary method for determining if a neighbor crosspoint of a crosspoint$_{i,j}$ is in a previous schedule) Responsive to a determination that a neighbor crosspoint$_{k,l}$ of the crosspoint$_{i,j}$ does not belong to the previous schedule, it is determined whether or not to add the crosspoint$_{i,j}$ to the updated schedule based on an occupancy of the j$^{th}$ virtual output queue corresponding to the input port i (Block 435) and the method is left (Node 445). On the other hand, responsive to a determination that a neighbor crosspoint$_{k,l}$ of the crosspoint$_{i,j}$ belongs to the previous schedule, the crosspoint$_{i,j}$ is excluded from the updated schedule (Block 440) and the method is left (Node 445).

Referring back to block 425, a crosspoint is a "neighbor" of crosspoint$_{i,j}$ if the crosspoint has the same input port i but a different output port ĵ than the output port j, or if the crosspoint has the same output port j but a different input port ī than the input port i.

Referring back to block 435, the act of determining whether or not to add the crosspoint$_{i,j}$ in the updated schedule based on the occupancy of the j$^{th}$ virtual output queue corresponding to the input port i might be performed, for example, by (1) determining a weight of the j$^{th}$ virtual output queue corresponding to the input i as a function of the occupancy of the queue, where weight$_{i,j}$(n)=W(Q$_{i,j}$(n)), which is a concave function of the queue size (e.g., weight$_{i,j}$(n)=log(log(Q$_{ij}$(n)))), (2) determining a probability $$p_{i,j} = \frac{e^{weight_{i,j}}}{1 + e^{weight_{i,j}}},$$

and (3) adding the crosspoint$_{i,j}$ to the updated schedule with a probability p$_{i,j}$, and otherwise does not add crosspoint$_{i,j}$ to the updated schedule. So, p$_{ij}$ is also a concave function of the queue length Q$_{ij}$ such that a longer queue has a higher probability to become active.

Referring back to 425' of FIG. 4, FIG. 5 is a flow diagram of an exemplary method 425' for determining if a neighbor crosspoint of a crosspoint$_{i,j}$ is in a previous schedule consistent with the present invention. An input port i receives one-bit information from an output port j which indicates whether or not the output port j received a packet from an input port k, different from input port i, in a time slot immediately before a current time slot. (Block 505) It is determined whether the output port j received a packet from an input port k, different from input port i, in a time slot immediately before a current time slot. (Decision 510) Responsive to a determination that the output port j did receive a packet from an input port k, different from input port i, in the time slot immediately before the current time slot, it is determined that the crosspoint$_{k,j}$ belonged to the previous schedule (Block 515), and the method 425' is left (Node 535). Referring back to decision 510, responsive to a determination that the output port j did not receive a packet from an input port k, it is determined whether any other neighbor crosspoint$_{k,l}$ of the crosspoint$_{i,j}$ belonged to the previous schedule (Decision 520). Responsive to a determination that a neighbor crosspoint$_{k,l}$ of the crosspoint$_{i,j}$ belonged to the previous schedule, it is concluded that a neighbor crosspoint$_{k,l}$ of the crosspoint$_{i,j}$ belonged to the previous schedule (Block 525), and the method 425' is left (Node 535). Referring back to decision 520, responsive to a determination that no other neighbor crosspoints$_{k,l}$ of the crosspoint$_{i,j}$ belonged to the previous schedule, it is concluded that no other neighbor crosspoints$_{k,l}$ of the crosspoint$_{i,j}$ belonged to the previous schedule (Block 530), and the method is left (Node 535).

From the prior work of Tassiulas, it can be seen that using memory can significantly reduce computational complexity of scheduling algorithms. The reason is that there is at most one arrival (departure) in a time slot for each input (output). A schedule with a heavy weight will continue to be heavy over a few time slots with a very high probability. Therefore, the previous schedule includes some information which may be used to generate the next schedule. By using memory, the scheduling algorithm may be highly simplified and still maintain a good throughput performance. Unlike Tassiulas and Giaccone, the exemplary Allerton scheduling process 300 attempts to add (or remove) an edge to (or from) the schedule with a probability, which is a function of the queue length as discussed above with reference to FIG. 4. The system will converge to a steady state when schedules with heavier weights have higher probabilities to be selected at every time slot. (See, e.g., the articles, S. Ye, Y. Shen, and S. S. Panwar, "DISQUO: A Distributed 100% Throughput Algorithm for a Buffered Crossbar Switch," *Proceedings of IEEE Workshop on HPSR* (June 2010); S. Rajagopalan and D. Shah, "Distributed Algorithm and Reversible Networks," *Proc. of CISS* (March 2008); S. Rajagopalan, D. Shah, and J. Shin, "Network Adiabatic Theorem: An Efficient Randomized Protocol for Contention Resolution," *Proc. of ACM SIGMETRICS* (2009); L. Jiang and J. Walrand, "A Distributed Algorithm for Optimal Throughput and Fairness in Wireless Networks with a General Interference Model," *IEEE/ACM Transactions on Networking*, Vol. 18, pp. 960-972, (June 2010); and J. Ni and R. Srikant, "Q-CSMA: Queue-Length Based CSMA/CA Algorithms for Achieving Maximum Throughput and Low Delay in Wireless Networks," *Proc. of IEEE INFOCOM Mini-Conference*, (San Diego, Calif.) (March 2010), all incorporated herein by reference.)

An exemplary scheduling process consistent with the present invention is now described in mathematical terms.

Referring back to 305 of FIG. 3, a Hamiltonian walk schedule H(n) visits each of the N! distinct matchings of N×N switch exactly once during N! slots. A distributed Hamiltonian walk can be easily generated with a time complexity of O(1). (See, e.g., the article, P. Giaccone, B. Prabhakar, and D. Shah, "Toward Simple, High Performance Schedulers for High-Aggregate Bandwidth Switches," *Proc. of IEEE INFOCOM*, (New York, 2002), incorporated herein by reference.) At the beginning of a time slot n, feasible schedule H(n), which satisfies the condition $\Sigma_{i,j} H_{ij}(n)=1$ is accepted or generated. This means that there is only one active crosspoint in H(n). For a N×N switch there are totally $N^2$ such schedules.

Referring back to 310 of FIG. 3, a previous schedule S(n−1), for a time slot (n−1) is accepted. Following the scheduling process, each input port i has to keep track of the schedule of the previous time slot, i.e., for which output port j was $S_{ij}(n-1)=1$.

After H(n) is generated and the previous schedule S(n−1) is accepted, each input can make its scheduling decision following the pseudo code below. Referring back to block 325 of FIG. 3, the schedule S(n) may then be generated by merging S(n−1) and H(n) as follows:

ALLERTON Scheduling Process Pseudo Code
$\forall (i,j) \notin H(n)$:
  (a) $S_{ij}(n)=S_{ij}(n-1)$
For $(i,j) \in H(n)$:
  If $(i,j) \in S(n-1)$
    if the packet transmission between input i and output j has been completed:
  (b) $S_{ij}(n)=1$ with probability $p_{ij}$;
  (c) $S_{ij}(n)=0$ with probability $\bar{p}_{ij}=1-p_{ij}$
    Else, if the packet transmission between input i and output j has not been completed:
  (d) $S_{ij}(n)=S_{ij}(n-1)$
  Else, if $(i,j) \notin S(n-1)$, and $\forall (k,l) \in N(i,j)$, (determine if any neighbor of the crosspoint$_{i,j}$ was active)
    If $S_{kl}(n-1)=0$, then (there is no active neighbor (k, l))
  (e) $S_{ij}(n)=1$ with probability $p_{ij}$;
  (f) $S_{ij}(n)=0$ with probability $\bar{p}_{ij}=1-p_{ij}$.
    Else if $S_{kl}(n-1)=1$, then (there is an active neighbor)
  (g) $S_{ij}(n)=0$. (exclude the crosspoint$_{i,j}$ from consideration for the updated schedule for time slot n)

Note that in the foregoing, $S_{ij}(n)$ can change only when crosspoint$_{ij}$ is selected by H(n). Since there is only one crosspoint (i,j) in H(n), the scheduler only has to decide whether to change the value of $S_{ij}(n)$ based on the transmission status of N(i,j) and the probability $p_{ij}$. Therefore the computation complexity of the exemplary scheduling process is O(1). In at least some embodiments, the exemplary scheduling process is designed to schedule variable-size packets. When all the arriving packets have a fixed size of one cell, the exemplary scheduling process may be also called cell-mode scheduling process with a complexity of O(1).

§5.3.1 Distributed Implementation

In the exemplary scheduling process set forth in the foregoing pseudo code, the scheduling decisions are made and updated based on H(n), queue length and previous schedule. The scheduling process may use a centralized scheduler to generate a schedule at every time slot. Message passing may, therefore, be required between linecards and the scheduler. For example, each linecard may send queue length information to the scheduler at every time slot, and the scheduler may send the schedule generated to the linecards.

A distributed scheduling process may eliminate the need to pass the above messages between the line cards and a centralized scheduler. For example, suppose that each linecard has an input scheduler. If the input schedulers can make the scheduling decisions by themselves, message passing between the linecards and the switching fabric may not be required. The distributed scheduling process is easier to implement, especially for high-speed switching systems. In at least some embodiments of the distributed scheduling process consistent with the present invention, each input may have its own scheduler. An exemplary distributed scheduling process consistent with the present invention is described below.

In at least some embodiments, each input scheduler may still have to use a memory. The input scheduler keeps track of the schedule of the previous time slot. For example, input port i may have to remember for which output port j was $S_{ij}(n-1)=1$. At the beginning of time n, a new schedule H(n) has to be generated. The schedule H(n) can be pre-determined, for example, the crosspoint (i,j) which satisfies the condition $(i-1)*N+j-1=(n \mod N^2)$ may be the schedule H(n) at time n. After H(n) is generated, each input scheduler may update its schedule based on the pseudo code below.

ALLERTON Scheduling Process Pseudo Code (Distributed Scheduling)
Input Scheduling Decisions:
At each input port i,
∀(i,j)∈H(n):
(a) $S_{ij}(n)=S_{ij}(n-1)$
For (i,j)∈H(n):
If (i,j)∈$S_{ij}$(n−1) (that is, $S_{ij}(n-1)=1$)
  If the packet transmission between input i and output j has concluded:
(b) $S_{ij}(n)=1$ with probability $p_{ij}$;
(c) $S_{ij}(n)=0$ with probability $\bar{p}_{ij}=1-p_{ij}$
  Else, if the packet transmission between input i and output j has not been completed:
(d) $S_{ij}(n)=S_{ij}(n-1)=1$
Else, if (i,j)∉$S_{ij}$(n−1), and ∀(k,l)∈N(i,j), (determine if any neighbor of the crosspoint$_{i,j}$ was active)
  If $S_{kl}(n-1)=0$, then (there is no active neighbor (k, l))
(e) $S_{ij}(n)=1$ with probability $p_{ij}$;
(f) $S_{ij}(n)=0$ with probability $\bar{p}_{ij}=1-p_{ij}$.
  Else if $S_{kl}(n-1)=1$, then (there is an active neighbor)
(g) $S_{ij}(n)=S_{ij}(n-1)=0$. (exclude the crosspoint$_{i,j}$ from consideration for the updated schedule for time slot n)

As shown in the foregoing pseudo code, when the crosspoint (i,j) is selected by H(n) and (i,j)∉S(n−1), the input i may have to know the schedules of all crosspoints in N(i,j)={(i',j) or (i,j')|∀i'≠i, ∀j'≠j} to make a scheduling decision. However, input may only have the information for the crosspoints in {(i,j')|∀j'}, but not for the crosspoints in {(i',j)|∀i'≠i}. But this information is known to output j, because if their exists one i' such that $S_{i'j}(n-1)=1$, output j would receive a packet from input i' at time n−1. So, if output j can send the information that whether it was busy or not at time n−1, which is one-bit information, to input i, input i would have all the information it may need to make a decision. Therefore, at the beginning of time n, if (i,j)∈H(n), output j has to send a one-bit data to input i. In at least some exemplary embodiments, this may be done by using a low-rate channel. For example, when the data rate of each linecard is 100 Gbps and each cell has a size of 64 Bytes, a channel with a data rate of 100 Gbps/64*8≈0.2 Gbps may be sufficient for the one-bit message passing. In at least some exemplary embodiments, this may be implemented using an out-of-band signaling channel, e.g., an Ethernet line.

In the case of out-of-band signaling, an additional low-rate data channel may be required. Also, every linecard may have to connect to this low-rate channel and be equipped with a transmitter and a receiver, which may increase costs. However, since linecards are connected to each other over the switching fabric, the one-bit message may be passed over this switching fabric itself. Since the data packets are also transmitted over the fabric, this scheme may be referred to as "in-band" signaling.

FIG. 6 illustrates an exemplary in-band signaling method for sending one-bit information from an output port to an input port of a switch 600 consistent with the present invention. In the in-band signaling, at the beginning of each time slot, the inputs transmit the one-bit information following the schedule $H^T(n)$, which is the transpose of the matrix H(n). For example, for a 2×2 switch, if the random schedule is:

$$H = \begin{bmatrix} 0 & 1 \\ 0 & 0 \end{bmatrix}$$

-continued
$$H^T = \begin{bmatrix} 0 & 0 \\ 1 & 0 \end{bmatrix}$$

Crosspoint (1,2) is in H, so output 2 has to send a one-bit information to input 1. Since output 2 is in the same linecard 610 as input 2, it can first pass the information to input 2. Then input 2 transmits the information over the switching fabric 615 following the schedule $H^T$ to output 1 in the linecard 605, and then output 1 passes the information to input 1. It can be seen that a one-bit time before every slot should be used for the signaling. So, in at least some embodiments, the throughput may be down to 1−(1/(64*8+1))≈0.9981. A speedup of 1.002 may compensate for this throughput loss. In at least some embodiments, modest speedups may be needed in cell-based switches to compensate for the overhead of segmenting variable-size packets into fixed size cells, which leads to stuffing bits in the last cell.

For in-band signaling, in at least some exemplary embodiments, the system may have to be able to switch packets with two different lengths: (1) one-bit and (2) one-cell long. In some exemplary embodiments, the switching systems are designed to switch fixed-size cells. So, if the one-bit message has to be sent using the switching fabric, a one-cell time for the control message may have to be used, which reduces the throughput to only 0.5.

To minimize the decrease in throughput, multiple sub-schedulers may be used. For example, each input scheduler may be provided with M sub-schedulers 620, where M is less than the number of bits in one cell. At any time n, the (n mod(M+1)) sub-scheduler is used to switch cells. All the sub-schedulers update their schedules independently based on the distributed scheduling process explained above. As mentioned, for each sub-scheduler, one bit information is passed from the outputs to the inputs. So, at time n=k(M+1), one cell, with one bit of information for each sub-scheduler, is sent over the switching fabric 615 using the schedule $H^T$(k). Each sub-scheduler may get the information it needs from the output, and update its scheduler when it is used to switch cells in the next M slots. So the slot time for control message passing is fully utilized, and the throughput is again 1−(1/(64*8+1))≈0.9981.

§5.4 EXAMPLES OF EXEMPLARY SCHEDULING METHOD CONSISTENT WITH THE PRESENT INVENTION

The '207 provisional application provided an illustrative example to help explain the exemplary distributed scheduling process. FIGS. 7A-7E illustrate an example of operations consistent with the exemplary scheduling process pseudo code and properties set forth in §6.3 above of an exemplary scheduling method, with reference to the examples illustrated in '207 application. In these figures, round trip time (RTT) (the time taken for a packet to traverse from a line card of the switch to the switching fabric and back to the line card) for the switch is assumed to be zero, n=2 and adding a crosspoint$_{i,j}$ to the updated schedule means that $S_{ij}(n)=1$.

Figure 7A:
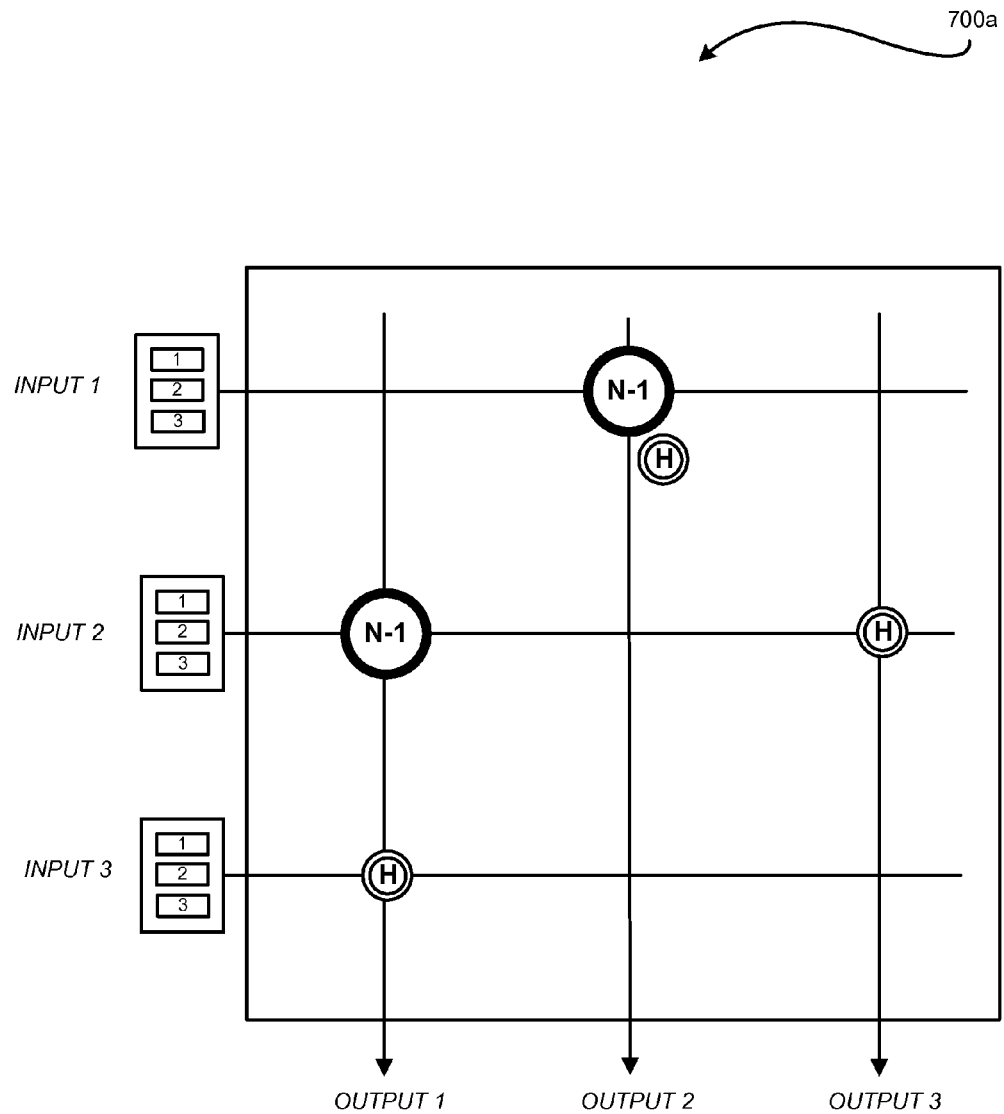
Figure 7B:
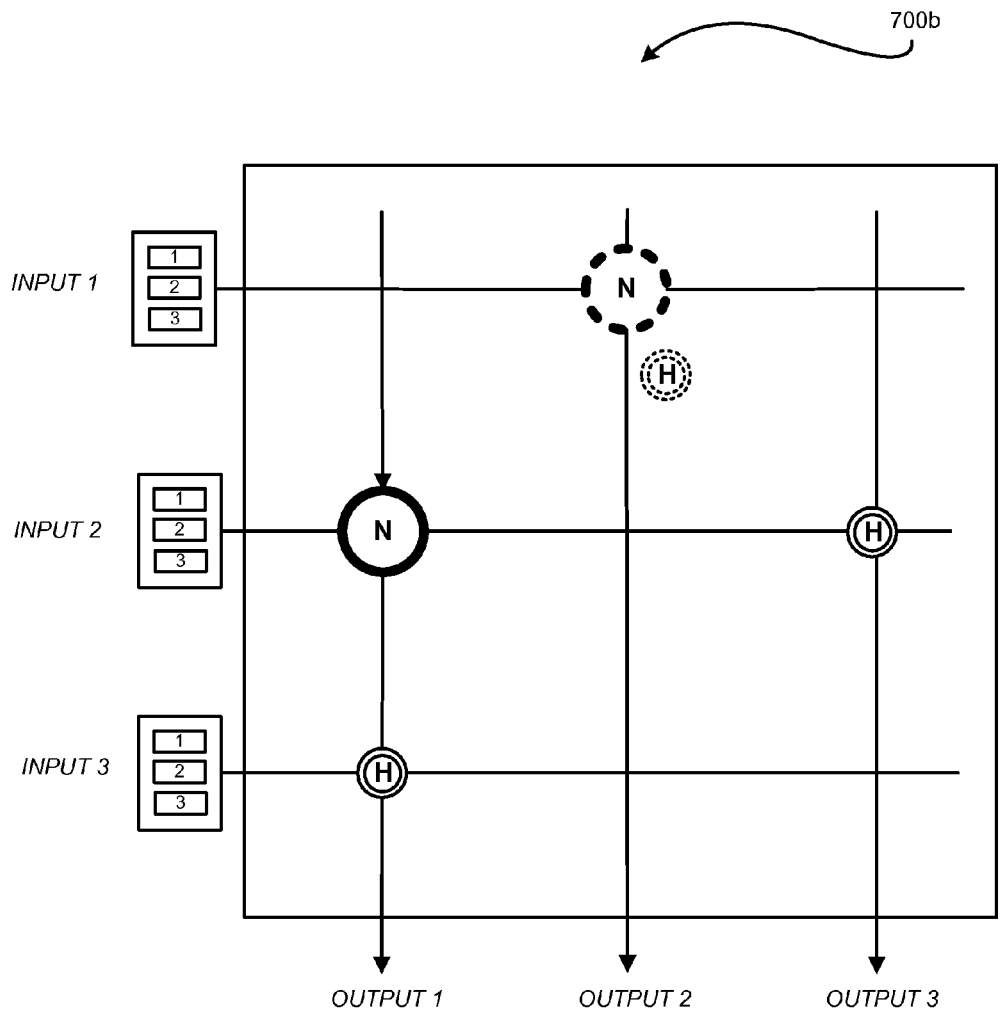

Referring first to FIG. 7A, the previous schedule 700a, at time slot n−1, includes crosspoint (1,2) and crosspoint (2,1) and the Hamiltonian walk schedule includes crosspoints {(1,2),(2,3),(3,1)}. The updated schedule, at time slot n, is determined as follows: For input 1, since crosspoints {(1,1),(1,3)} are not in Hamiltonian walk schedule, $S_{11}(n)=S_{11}(n-1)=0$ and $S_{13}(n)=S_{13}(n-1)=0$. (Recall line (a) of the Pseudo Code, and 410 of FIG. 4.) Therefore, none of the crosspoints {(1, 1),(1,3)} are added to the updated schedule as shown in FIG. 7B. Referring back to FIG. 7A, for crosspoint (1,2), since it is both in Hamiltonian and previous schedules, it is determined whether a packet transmission from input i to output port j has been completed. (Recall 405, 415 and 420 of FIG. 4.) In the current example, it is assumed that the packet transmission from input i to output port j has been completed. Therefore, a probability $p_{ij}$, which is a function of the queue size of crosspoint (1,2), would be used to determine whether or not to add this crosspoint to the schedule. (Recall lines (b) and (c) of the Pseudo Code, and 435 of FIG. 4.) As explained above, longer the queue $VOQ_{ij}$, higher is the probability of the crosspoint f) becoming active. In the current example, it is assumed that the queue $VOQ_{1,2}$ is not long enough for the crosspoint (1,2) to be activated. That is, $S_{12}(n)=0$. Therefore, the crosspoint (1,2) is excluded from the updated schedule 700b as shown in FIG. 7B. Thus, for input 1, there are no active crosspoints in the updated schedule.

Referring again to FIG. 7A, similarly for input 2, since crosspoints {(2,1),(2,2)} are not in the Hamiltonian schedule, $S_{21}(n)=S_{21}(n-1)=1$ and $S_{22}(n)=S_{22}(n-1)=0$. (Recall line (a) of the Pseudo Code, and 410 of FIG. 4.) Therefore, the crosspoint (1,1) is added to the update schedule 700c and the crosspoint (1,2) is excluded from the updated schedule 700c as shown in FIG. 7C. Referring back to FIG. 7A, since crosspoint (2,3) is in the Hamiltonian schedule, but not in the previous schedule, it is determined whether any neighbor crosspoints, such as crosspoints {(1,3),(3,3),(2,1),(2,2)} are active in the previous schedule. (Recall 405, 415 and 425 of FIG. 4.) Since the crosspoint (2,1), as shown in FIG. 7A, was active, $S_{23}(n)=0$ and therefore, the crosspoint (2,3) is excluded from the updated schedule as shown in FIG. 7C. (Recall line (g) of the Pseudo Code, and 430 and 440 of FIG. 4.)

Figure 7E:
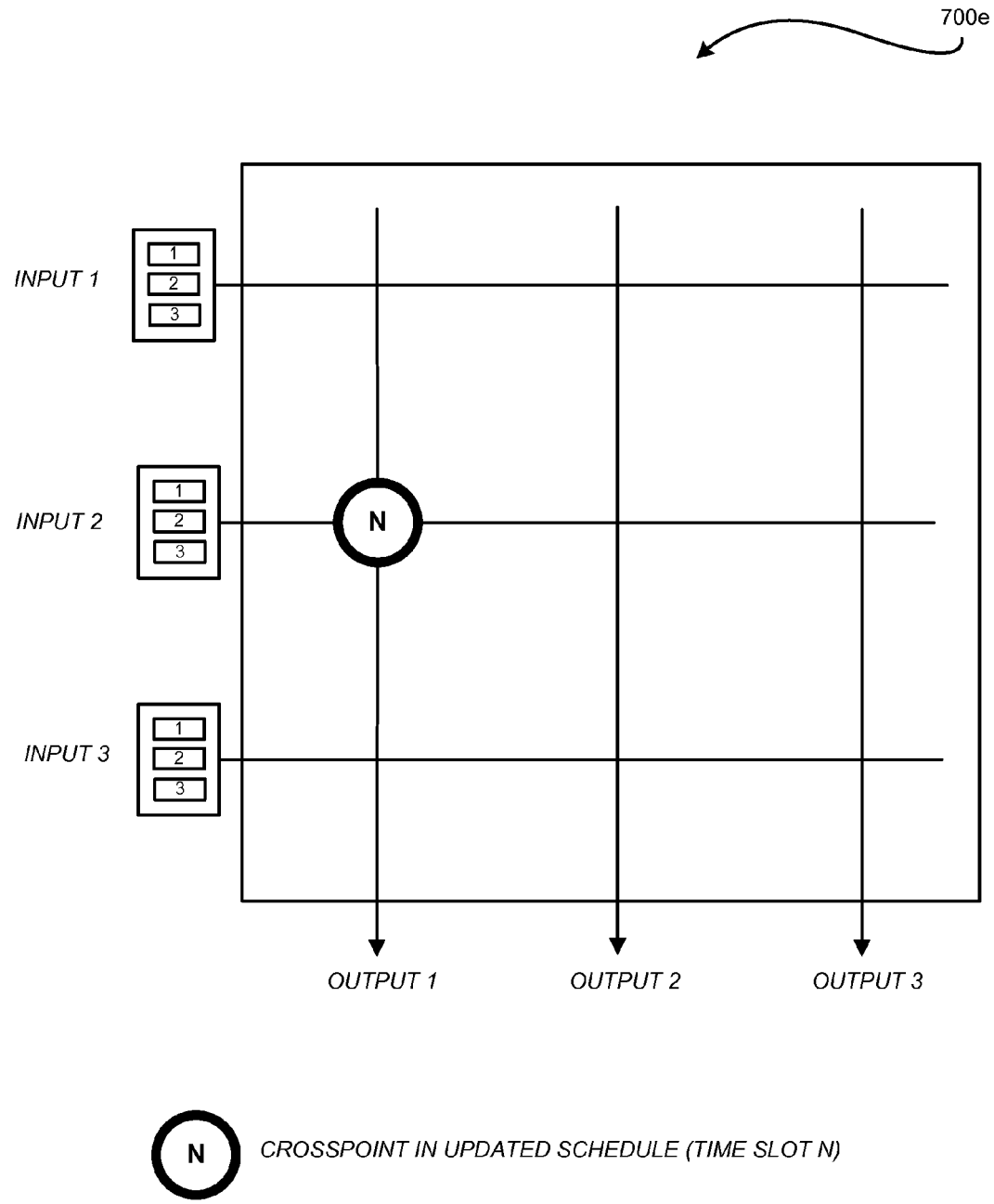

Referring again to FIG. 7A, similarly for input 3, since crosspoints {(3,2),(3,3)} are not in Hamiltonian walk schedule, $S_{32}(n)=S_{32}(n-1)=0$ and $S_{33}(n)=S_{33}(n-1)=0$. (Recall line (a) of the Pseudo Code, and 410 of FIG. 4.) Therefore, neither crosspoint {(3,2),(3,3)} is added to the updated schedule 700d as shown in FIG. 7D. Referring back to FIG. 7A, since crosspoint (3,1) is in the Hamiltonian schedule but not in the previous schedule, it is determined whether any neighbor crosspoints, such as crosspoints {(1,1), (2,1),(3,2),(3,3)} are active in the previous schedule. (Recall 405, 415 and 425 of FIG. 4.) Since the crosspoint (2,1), as shown in FIG. 7A, is active, $S_{31}(n)=0$ and therefore, the crosspoint (3,1) is excluded from the updated schedule 700d as shown in FIG. 7D. (Recall line (g) of the Pseudo Code, and 430 and 440 of FIG. 4.) The final results of the updated schedule 700e for time slot n is shown in FIG. 7E. In the current example, only the crosspoint (2,1) is included in the updated schedule 700e for time slot n.

§5.5 CHARACTERISTICS OF EXEMPLARY EMBODIMENTS

The stationary distribution and stability of an exemplary system is provided in Section II of the '207 provisional application. The simulation results of the exemplary system, which show its delay performance, are presented in Section IV of the '207 provisional application.

§5.6 CONCLUSION

As can be appreciated from the foregoing, embodiments consistent with the present invention can provide scheduling for an input-queued switch. The exemplary distributed scheduling process achieves 100% throughput for any admissible Bernoulli arrival traffic. The exemplary distributed scheduling process may be easily implemented with a low-rate control or by sacrificing the throughput by a small amount. Simulation results also showed that this distributed scheduling process can provide very good delay performance for different traffic patterns.

What is claimed is:

1. A computer-implemented method for scheduling packets in a switch having a plurality of output ports, a plurality of input ports, each of the plurality of input ports having a virtual output queue corresponding to each of the plurality of output ports, and a switch fabric coupling each of the input ports with each of the output ports, the computer-implemented method comprising:

a) generating or receiving a Hamiltonian walk schedule which defines, for each input port-output port crosspoint$_{i,j}$, whether the crosspoint$_{i,j}$ is in the Hamiltonian walk schedule or not;

b) accepting a previous schedule which defines, for each input port-output port crosspoint$_{i,j}$, whether the crosspoint$_{i,dj}$ is in the previous schedule or not, wherein,
      1) for each input port i, there is at most one crosspoint$_{i,j}$ scheduled in the previous schedule, and
      2) for each output port j, there is at most one crosspoint$_{i,dj}$ scheduled in the previous schedule; and c) at each input port i, for each crosspoint$_{i,j}$, merging the previous schedule with the Hamiltonian walk schedule to define an updated schedule such that:
      1) for a crosspoint$_{i,j}$ that is not in the Hamiltonian walk schedule, maintaining a value of the crosspoint$_{i,j}$ in the updated schedule as that value of the corresponding crosspoint$_{i,j}$ in the previous schedule, and
      2) for a crosspoint$_{i,j}$ that is in the Hamiltonian walk schedule,
         i) determining whether or not the crosspoint$_{i,j}$ belongs to the previous schedule,
         ii) responsive to a determination that the crosspoint$_{i,j}$ does belong to the previous schedule,
            A) determining whether or not a transmission of a packet between input port i and output port j has concluded,
            B) responsive to a determination that the transmission of the packet between input port i and output port j has not concluded, maintaining a value of the crosspoint$_{i,j}$ in the updated schedule as that value of the corresponding crosspoint$_{i,j}$ in the previous schedule, and
            C) responsive to a determination that the transmission of the packet between input port i and output port j has concluded, determining whether or not to maintain the crosspoint$_{i,j}$ in the updated schedule as a function of an occupancy of a virtual output queue corresponding to the input port i and the output port j, and
         iii) responsive to a determination that the crosspoint$_{i,j}$ does not belong to the previous schedule,
            A) determining whether or not any neighbor crosspoints$_{k,l}$ of crosspoint$_{i,j}$ belong to the previous schedule by acts including
               receiving one-bit information from output port j, which indicates whether the output port j received a packet from an input port k, different from input port i, in a time slot immediately before a current time slot, and
               responsive to a determination that the output port j did receive a packet from an input port k, different from input port i, in the time slot immediately before the current time slot, determining that a crosspoint$_{k,j}$ corresponding to the input port k and the output port j belonged to the previous schedule, B) responsive to a determination that a neighbor crosspoint$_{k,l}$ of the crosspoint$_{i,j}$ belonged to the previous schedule, excluding the crosspoint$_{i,j}$ from the updated schedule, and C) responsive to a determination that a neighbor crosspoint$_{k,l}$ of the crosspoint$_{i,j}$ did not belong to the previous schedule, determining whether or not to add the crosspoint$_{i,j}$ to the updated schedule as a function of an occupancy of the j$^{th}$ virtual output queue corresponding to the input port i.

2. The method of claim 1, wherein the packets are variable-size packets.

3. The method of claim 2, wherein each of the variable-size packets are segmented into one or more fixed-size cells, each of the one or more fixed-size cells having a predetermined number of bits, before transmission to each of the plurality of output ports.

4. The method of claim 1, wherein the one-bit information is transmitted from the output port j to the input port i using a low-rate channel between the input port i and the output port j.

5. The method of claim 1, wherein the output port j sends the one-bit information indicating whether the output port j received a packet from an input port k, different from input port i, in a time slot immediately before a current time slot, to the input port i.

6. The method of claim 1, wherein the one-bit information is transmitted from the output port j to the input port i using a switching fabric of the switch.

7. The method of claim 6, wherein the one-bit information is transmitted using in-band signaling, the in-band signaling including sending the one-bit information, at a beginning of each time slot, using a schedule H$^T$, which is a transpose of the Hamiltonian walk schedule.

8. The method of claim 1, wherein a crosspoint is a neighbor of crosspoint$_{i,j}$ if the crosspoint has the same input port i but a different output port j̄ than the output port j, or the same output port j but a different input port ī than the input port i.

9. The method of claim 1, wherein the act of determining whether or not to add the crosspoint$_{i,j}$ in the updated schedule as a function of an occupancy of the j$^{th}$ virtual output queue corresponding to the input port i, determines a weight of the j$^{th}$ virtual output queue corresponding to the input i, the weight being denoted as weight$_{i,j}$, as a function of the occupancy of the queue, determines a probability $$p_{i,j} = \frac{e^{weight_{i,j}}}{1 + e^{weight_{i,j}}},$$

and adds the crosspoint$_{i,j}$ to the updated schedule with a probability $p_{i,j}$, and otherwise does not add the crosspoint$_{i,j}$ to the updated schedule.

10. The method of claim 1, wherein the act of determining whether or not to add the crosspoint$_{i,j}$ to the updated schedule as a function of an occupancy of the j$^{th}$ virtual output queue corresponding to the input port i, determines a probability $p_{i,j}$ as a concave function of the occupancy of the j$^{th}$ virtual output queue corresponding to the input i, and adds the crosspoint$_{i,j}$ to the updated schedule with a probability $p_{i,j}$, and otherwise does not add the crosspoint$_{i,j}$ to the updated schedule.

11. The method of claim 3, wherein the schedule is generated at every M time slots, where M is a function of number of bits in the one or more fixed-size cells.

12. The method of claim 11, wherein the updated schedule is a schedule of the packets for a current time slot.

13. The method of claim 12, wherein the previous schedule is a schedule of the packets at M time slots before a current time slot.

14. A scheduler for scheduling packets in a switch having a plurality of output ports, a plurality of input ports, each of the plurality of input ports having a virtual output queue corresponding to each of the plurality of output ports, and a switch fabric coupling each of the input ports with each of the output ports, the scheduler comprising:

at least one processor; and at least one storage device storing program instructions which, when executed by the at least one processor, cause the at least one processor to perform a method including:

a) generating or receiving a Hamiltonian walk schedule which defines, for each input port-output port crosspoint$_{i,j}$, whether the crosspoint$_{i,j}$ is in the Hamiltonian walk schedule or not;

b) accepting a previous schedule which defines, for each input port-output port crosspoint$_{i,j}$, whether the crosspoint$_{i,j}$ is in the previous schedule or not, wherein, 1) for each input port i, there is at most one crosspoint$_{i,j}$ scheduled in the previous schedule, and 2) for each output port j, there is at most one crosspoint$_{i,j}$ scheduled in the previous schedule; and c) at each input port i, for each crosspoint$_{i,j}$ merging the previous schedule with the Hamiltonian walk schedule to define an updated schedule such that:

1) for a crosspoint$_{i,j}$ that is not in the Hamiltonian walk schedule, maintaining a value of the crosspoint$_{i,j}$ in the updated schedule as that value of the corresponding crosspoint$_{i,j}$ in the previous schedule, and 2) for a crosspoint$_{i,j}$ that is in the Hamiltonian walk schedule, i) determining whether or not the crosspoint$_{i,j}$ belongs to the previous schedule, ii) responsive to a determination that the crosspoint$_{i,j}$ does belong to the previous schedule, A) determining whether or not a transmission of a packet from input port i to output port j has concluded, B) responsive to a determination that the transmission of the packet from input port i to output port j has not concluded, maintaining a value of the crosspoint$_{i,j}$ in the updated schedule as that value of the corresponding crosspoint$_{i,j}$ in the previous schedule, and C) responsive to a determination that the transmission of the packet from input port i to output port j has concluded, determining whether or not to maintain the crosspoint$_{i,j}$ in the updated schedule as a function of an occupancy of a virtual output queue corresponding to the input port i and the output port j, and iii) responsive to a determination that the crosspoint$_{i,j}$ does not belong to the previous schedule,
   A) determining whether or not any neighbor crosspoints$_{k,l}$ of crosspoint$_{i,j}$ belong to the previous schedule by acts including
      receiving one-bit information from output port j, which indicates whether the output port j received a packet from an input port k, different from input port i, in a time slot immediately before a current time slot, and
      responsive to a determination that the output port j did receive a packet from an input port k, different from input port i, in the time slot immediately before the current time slot, determining that a crosspoint$_{k,j}$ corresponding to the input port k and the output port j belonged to the previous schedule,
   B) responsive to a determination that a neighbor crosspoint$_{k,l}$ of the crosspoint$_{i,j}$ belonged to the previous schedule, excluding the crosspoint$_{i,j}$ from the updated schedule, and
   C) responsive to a determination that a neighbor crosspoint$_{k,l}$ of the crosspoint$_{i,j}$ did not belong to the previous schedule, determining whether or not to add the crosspoint$_{i,j}$ to the updated schedule as a function of an occupancy of the j$^{th}$ virtual output queue corresponding to the input port i.

15. The scheduler of claim 14, wherein the packets are variable-size packets.

16. The scheduler of claim 15, wherein each of the variable-size packets are segmented into one or more fixed-size cells, each of the one or more fixed-size cells having a predetermined number of bits, before transmission to each of the plurality of output ports.

17. The scheduler of claim 14, wherein the one-bit information is transmitted from the output port j to the input port i using a low-rate channel between the input port i and the output port j.

18. The scheduler of claim 14, wherein the output port j sends the one-bit information indicating whether the output port j received a packet from an input port k, different from input port i, in a time slot immediately before a current time slot, to the input port i.

19. The scheduler of claim 14, wherein the one-bit information is transmitted from the output port j to the input port i using a switching fabric of the switch.

20. The scheduler of claim 14, wherein a crosspoint is a neighbor of crosspoint$_{i,j}$ if the crosspoint has the same input port i but a different output port than the output port j, or the same output port j but a different input port than the input port i.

21. The scheduler of claim 14, wherein the act of determining whether or not to add the crosspoint$_{i,j}$ in the updated schedule as a function of an occupancy of the j$^{th}$ virtual output queue corresponding to the input port i,
   determines a weight of the j$^{th}$ virtual output queue corresponding to the input i, the weight being denoted as weight$_{i,j}$, as a function of the occupancy of the queue,
   determines a probability $$p_{i,j} = \frac{e^{weight_{i,j}}}{1 + e^{weight_{i,j}}},$$

and
   adds the crosspoint$_{i,j}$ to the updated schedule with a probability p$_{i,j}$, and otherwise does not add the crosspoint$_{i,j}$ to the updated schedule.

22. The scheduler of claim 14, wherein the act of determining whether or not to add the crosspoint$_{i,j}$ to the updated schedule as a function of an occupancy of the j$^{th}$ virtual output queue corresponding to the input port i,
   determines a probability p$_{i,j}$ as a concave function of the occupancy of the j$^{th}$ virtual output queue corresponding to the input i, and
   adds the crosspoint$_{i,j}$ to the updated schedule with a probability p$_{i,j}$, and otherwise does not add the crosspoint$_{i,j}$ to the updated schedule.

23. The scheduler of claim 16, wherein the schedule is generated at every M time slots, where M is a function of number of bits in the one or more fixed-size cells.

24. The scheduler of claim 23, wherein the updated schedule is a schedule of the packets for a current time slot.

25. The scheduler of claim 24, wherein the previous schedule is a schedule of the packets at M time slots before a current time slot.

* * * * *